May 10, 1938.  C. J. SCHROEDER  2,116,769
PRESSURE VACUUM RELIEF VALVE
Filed June 30, 1937
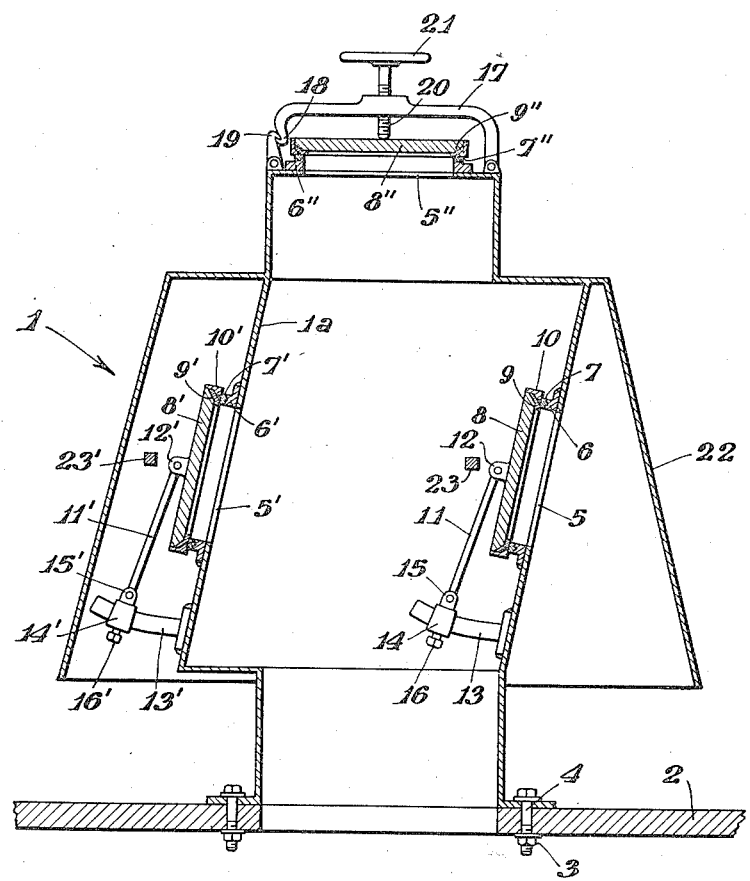
INVENTOR.
Carl J. Schroeder
BY Lyle S. Motley
ATTORNEY.

Patented May 10, 1938

2,116,769

UNITED STATES PATENT OFFICE 2,116,769

PRESSURE VACUUM RELIEF VALVE

Carl J. Schroeder, Hammond, Ind., assignor to Standard Oil Company, Chicago, Ill., a corporation of Indiana Application June 30, 1937, Serial No. 151,168

5 Claims. (Cl. 277—48)

The present invention relates to vent valves and particularly to that class of vent valves which are adapted for use on large storage tanks containing volatile materials and wherein these valves are required to be responsive in their operation to small changes in pressure or vacuum.

In the storage of volatile materials such as hydrocarbons stored in large tanks it is of vital importance that provision be made for venting in response to very slight variations in the pressure within the tank. This is referred to in the art as "breathing." Such changes in pressure are caused for example by decreasing temperature, which has the effect of producing a vacuum. Provision must therefore be made under conditions where the temperature has been lowered for permitting the ingress of air to prevent the collapse of the tank. On the other hand, where there is a rise in temperature there is an increase in pressure within the tank. Similarly under the latter conditions provision must be made for allowing the escape of excess vapors to prevent the rupture of the tank. It has been found that with tanks of large volume, only very small differences between the pressure within and the pressure on the outside of the tank can be tolerated without resulting in collapse or rupture. For these reasons the type of venting device employed must be extremely sensitive to minute differentials in the pressure between the inside and outside of the tank.

Valves involving sliding surfaces have been found unsatisfactory for the present purposes since the resulting friction renders them sluggish. Likewise valves wherein the valve and seat engaging surfaces lie either in the horizontal plane or at a small angle thereto have been found unsatisfactory, due to the collection of foreign matter thereon and the consequent failure to seat properly because of the interference of such matter. Negligible amounts of foreign material which would not affect the operation of a valve employed in the usual capacity becomes of quite serious importance in connection with a valve of the present class which must respond in its operation to such minute pressure differentials.

Known forms of valves which rely upon the action of springs or equivalent sources of force for urging them into closed position have likewise been found to be unsatisfactory. In this type of valve the minimum closing force is necessarily applied in fully closed position, this force increasing as the valve is opened. Such an arrangement has the obvious disadvantage of requiring the careful adjustment of the spring or other means to prevent placing too great a force upon the valve while in closed position in order to assure its opening in response to the desired values of pressure differential. It is often difficult to place a sufficient spring urging force on the valve to maintain it closed and at the same time assure its operation in response to minute changes of pressure. This form of valve while usually satisfactory in other relations has been found to be quite ineffective in the solution of the present problem.

I am aware that it has been heretofore proposed to operate vent valves by the action of gravity thereon but in these installations the entire weight of the valve has been employed. This is too great a force under most conditions and the requisite sensitiveness is therefore not obtained.

It is an object of the present invention to provide a vacuum-pressure vent valve wherein the friction of sliding parts has been substantially eliminated. It is an object of the present invention to provide a valve of the present class wherein the action of gravity is employed for urging the same into closed position in a manner which secures the requisite sensitiveness and efficiency of operation. Another object of the present invention is to provide in a vent valve of the present class an arrangement for utilizing a small fraction of the force of gravity acting on the valve for urging it to closed position and wherein this small fraction of the force of gravity is at a maximum when the valve is in a closed position and decreases as the valve is moved away from closed position. It is a still further object of the present invention to provide in a valve of the present class for the elimination of the friction of sliding surfaces and at the same time make it possible to maintain engaging surfaces in a substantially vertical plane, or in other words, a plane having a small angle with respect to the vertical whereby to eliminate horizontal or near horizontal surfaces which tend to collect foreign matter and prevent the proper functioning of the valve.

A better understanding of my invention may be had from the following detailed description taken in connection with the single figure of the drawings which forms a part of this specification and wherein there is shown a vertical cross-sectional view of a preferred embodiment of a valve assembly in accordance with my invention.

A valve body indicated generally by numeral 1 is mounted on a storage tank 2 about an opening formed therein, such for example as the usual manhole opening, and attached to the tank as by means of the usual nuts 3 and bolts 4.

A pair of circular openings or ports 5 and 5' are formed in the upwardly extending wall 1a of the valve body 1. An annular seating ring 6 is attached as by welding to the inside of the wall about the periphery of port 5 and a second annular seating ring 6' is attached in a like manner to the outside of the wall about the periphery of the port 5'. These rings are supplied with a wear and corrosion-resisting seating surface, such for example as "stellite" 7 and 7'.

A disc-like valve 8 is arranged for cooperation with the seating ring 6 for normally closing the port 5 but operable to admit air to the tank 2 in response to the occurrence of a predetermined degree of vacuum therein. A second disc-like valve 8' is arranged for cooperation with the seating ring 6' for normally closing port 5' but operable to vent vapors from the tank 1 in response to the occurrence of a predetermined excess pressure therein. A suitable arrangement of sealing ring is provided about the outer portion of each of the valves 8 and 8' for cooperation with the seating ring 6 and 6', and preferably takes the form of "thiokol" washers 9 and 9' held in position by rings 10 and 10'. The combination of "thiokol" and "stellite" for valve engaging surfaces is covered by my prior Patent 2,068,248 (January 19, 1937).

I have provided a novel arrangement for supporting and guiding the valves 8 and 8' into and out of engagement with the seating rings 6 and 6'. Arms 11 and 11' are pivotally attached to the back of the valves 8 and 8' preferably at points 12 and 12' slightly above the centers of gravity of the valves to thus cause the faces of the valves to tend to assume a position in the same plane as that of their respective seats when moved into seating position. Arms 11 and 11' are extended downwardly and pivoted to an adjustable support. This support may take several forms so long as there is provision for the adjustment of the lower ends of the arms 11 and 11' along an arc of the circles defined by the lower ends of these arms when pivoted about their points of attachment on the backs of said valves. The form of adjustable support shown has the particular advantage of being simple, inexpensive and readily adjustable. A pair of brackets 13 and 13' having the requisite arcuate shape are each attached to the valve body below the valves 8 and 8' as by welding. A pair of collars 14 and 14' having pivotal supports 15 and 15' on their upper sides for reception of the lower ends of arms 11 and 11' are mounted on and embrace the arcuate brackets 13 and 13'. These collars are adjustable along the arcuate brackets and set screws 16 and 16' pass through the collars for locking engagement with the brackets to maintain the desired position of adjustment. The pivots 15 and 15' are always made to have a position below the centers of gravity of the respective valves and outside a plane passing through the respective centers of gravity and generally parallel to the respective faces of the valves.

With this arrangement it will be readily seen that the force of gravity acting on the respective valves 8 and 8' will be divided into two components, one acting down through the respective arms 11 and 11' and the other acting in a direction substantially perpendicular to the plane of the valve face when in position on its seat. The component of force tending to close the valve will have a maximum value when the valve is in a closed position and decrease as the valve is opened and its respective supporting arm 11 or 11' moved towards a vertical position about pivots 15 and 15'. By varying the position of the respective supports 14 and 14' along arcuate brackets 13 and 13', very fine and sensitive adjustments of the valves can be obtained.

Stops 23 and 23' limit the movement of valves 8 and 8' so that supporting arms 11 and 11' cannot pass or even approach the vertical position. Thus the force of gravity is always available to close the valves.

A sampling hatch is provided on the top of the valve body and includes a port 5", a seating ring 6" and a valve 8", together with the special seat of "stellite" 7" and sealing washer of "thiokol" 9", all as provided for ports 5 and 5', thus securing the advantage of interchangeability of certain parts. A locking arrangement is provided for normally holding valve 8" in place which includes a latch member 17 pivoted to the valve body at one end, extending over the valve 8" and provided on its other end with a hooked portion 18 for engagement by a latch 19 carried by the valve body. A threaded spindle 20 is passed through the latch member 17 intermediate the ends thereof and is arranged to be rotated into engagement with valve 8" by hand wheel 21 for maintaining the same closed. This readily removable hatch furnishes quick access through the common opening in the tank for the purpose of taking samples of the fluid contained therein.

While I have shown the faces of seating rings 6 and 6' slightly inclined, and prefer this arrangement since it gives improved results, I also contemplate an arrangement of these faces in the strictly vertical plane as being within the teaching of my invention.

An important fact to be noted is that the present arrangement makes possible the maintenance of all engaging surfaces in substantially a vertical plane to thus eliminate the accumulation of foreign material which would otherwise take place and foul the valve were horizontal or near horizontal engaging surfaces employed. This vertical disposition of the faces is accomplished while at the same time the valve is arranged for movement on a pivotal anti-friction support. This eliminates friction and sluggishness due to sliding parts.

A hood 22 of suitable sheet metal material surrounds the vacuum and pressure relief valves as a protection against the elements.

No attempt has been made to show actual scale or design, it being understood that accepted engineering practice will be followed in the design and construction of the complete structure disclosed therein.

While I have described my invention in connection with a specific embodiment thereof this is by way of example only and is not intended to limit the scope of my invention except as indicated by the following claims which should be construed as broadly as the prior art will permit.

I claim:

1. A sensitive relief valve operable in response to small pressure differentials for use on storage tanks adapted to confine volatile materials, said valve including a valve body adapted to be attached about the opening in said tank in communication with the vapor space thereof, a valve seat in said body, said valve seat being positioned in a substantially vertical plane, a valve having a face for engaging said seat, means for supporting said valve for movement into and out of engagement with said seat in response to small changes in the pressure within said vapor space, said means comprising a member extending from said valve, a pivotal support for said member, said support being disposed below the center of gravity of said valve and outside a vertical plane passing through said center of gravity whereby the effective force of gravity is divided into a first component acting downwardly through said support and a second component acting on said valve in a direction substantially perpendicular to the plane of said valve seat when said valve is in engagement with said seat, said second component having its maximum value when said valve is in the closed position and decreasing as said valve is opened, said maximum value being only a small fraction of the total force of gravity acting on said valve in any position.

2. The sensitive relief valve defined in claim 5 wherein there is provided means for adjusting said pivotal supports along the arc of a circle having a radius substantially the length of said members extending from said valves.

3. The sensitive relief valve defined in claim 5 wherein there is provided means for adjusting said pivotal supports along the arc of the circle defined by said members extending from said valves, said means comprising arcuate brackets, collars received on and adjustable along said arcuate brackets, said collars each having a pivotal support for receiving said respective members extending from said valves.

4. A sensitive vapor pressure relief valve for use on a storage tank adapted to confine volatile materials, said valve including a valve body adapted to be attached about an opening in said tank, a valve seat in said body, said valve seat being positioned in a substantially vertical plane, a valve having a face for engaging said seat, means for supporting said valve for movement into and out of engagement with said seat in response to predetermined changes in the vapor pressure within said tank of the order of about one ounce per square inch, said means comprising a member extending from said valve, a pivotal support for said member, said support being disposed below the center of gravity of said valve and outside a vertical plane passing through said center of gravity and generally parallel to the face of said valve whereby the effective force of gravity is divided into a first component of force acting downwardly through said support and a second component of force acting on said valve in a direction substantially perpendicular to the plane of said valve seat when said valve is in engagement with said seat, said second component having its maximum value when said valve is in the closed position and decreasing as said valve is opened, said maximum value being only a small fraction of the total force of gravity acting on said valve in any position.

5. A sensitive vacuum vent valve for large storage tanks adapted to contain volatile materials, said valve including a housing adapted to be received about an opening in communication with the vapor space of said tank, said housing being provided with a first means operable in response to a predetermined degree of vacuum in said vapor space for venting the same, and a second means operable responsive to a predetermined excess pressure in said vapor space for venting the same, said first means comprising a first port formed in said housing and provided with a valve seat about the periphery thereof, said seat being positioned in a substantially vertical plane and facing inwardly of said housing, said second means comprising a second port formed in said housing and provided with a second valve seat about the periphery thereof, said seat being positioned in a substantially vertical plane and facing outwardly of said housing, each of said seats being provided respectively with a valve for engagement therewith, means for supporting each of said valves for movement into and out of engagement with its respective seat, said means comprising a member extending from each of said valves, a pivotal support for each of said members, said supports each being disposed below the center of gravity of its respective valve and outside the vertical planes passing through said respective centers of gravity and in a direction generally parallel to the faces of said valves, whereby the force of gravity acting upon each valve is divided into a first component and a second component, respectively, said first components acting downwardly through the respective pivotal supports and said second components acting substantially perpendicular to the plane of said respective seats, and having its maximum value when said valve is in position on its seat.

CARL J. SCHROEDER.